(12) United States Patent
Guo et al.

(10) Patent No.: US 10,717,119 B2
(45) Date of Patent: Jul. 21, 2020

(54) POTENTIAL DIFFERENCE-BASED DIVERSION ELECTRODE ARRANGEMENT AND FIELD INTENSITY COMPENSATION METHOD

(71) Applicant: SHENYANG INSTITUTE OF APPLIED ECOLOGY, CHINESE ACADEMY OF SCIENCES, Shenyang (CN)

(72) Inventors: Shuhai Guo, Shenyang (CN); Bo Wu, Shenyang (CN); Fengmei Li, Shenyang (CN); Jianing Wang, Shenyang (CN)

(73) Assignee: Shenyang Institute of Applied Ecology, Chinese Academy of Sciences, Shenyang, Liaoning (CN)

( * ) Notice: Subject to any disclaimer, the term of this patent is extended or adjusted under 35 U.S.C. 154(b) by 291 days.

(21) Appl. No.: 15/532,781

(22) PCT Filed: Mar. 30, 2016

(86) PCT No.: PCT/CN2016/077779
§ 371 (c)(1),
(2) Date: Jun. 2, 2017

(87) PCT Pub. No.: WO2017/152440
PCT Pub. Date: Sep. 14, 2017

(65) Prior Publication Data
US 2018/0043406 A1 Feb. 15, 2018

(30) Foreign Application Priority Data
Mar. 11, 2016 (CN) .......................... 2016 1 0137627

(51) Int. Cl.
*B09C 1/08* (2006.01)
*A01B 47/00* (2006.01)

(52) U.S. Cl.
CPC .............. *B09C 1/085* (2013.01); *A01B 47/00* (2013.01); *B09C 1/08* (2013.01); *B09C 2101/00* (2013.01)

(58) Field of Classification Search
CPC ............ A01B 47/00; B09C 1/08; B09C 1/085
(Continued)

(56) References Cited

U.S. PATENT DOCUMENTS

| 4,124,359 A | 11/1978 | Geller |
| 5,074,986 A * | 12/1991 | Probstein et al. ..... B01D 61/56 204/515 |

(Continued)

FOREIGN PATENT DOCUMENTS

| CN | 1695835 A | 11/2005 |
| CN | 101767105 A | 7/2010 |

(Continued)

OTHER PUBLICATIONS

Chinese Search Report dated Mar. 15, 2018 for CN Application No. 201610137627.0 (1 page).

(Continued)

*Primary Examiner* — Tara Mayo-Pinnock
(74) *Attorney, Agent, or Firm* — Smith, Gambrell & Russell, LLP

(57) ABSTRACT

The present invention relates to a potential difference-based diversion electrode arrangement and field intensity compensation method, comprising the following steps: the arrangement positions of paired diversion electrodes are determined according to the difference of potential around a position of field intensity to be compensated and the direction of an electric field line, and the paired diversion electrodes are inserted; and the field intensity enhancement rate of the position of field intensity to be compensated and the compensated field intensity value are calculated according to the (Continued)

difference of potential and arrangement positions of the paired diversion electrodes. In the present invention, the paired diversion electrodes are arranged in the direction of the electric field line by using the spatial difference of potential in the electric field, and the compensation of local field intensity is implemented, thereby beneficial to improving the overall efficiency of electrokinetic remediation for organic contaminated soil, and reducing the spatial difference of remediation efficiency.

6 Claims, 2 Drawing Sheets

(58) Field of Classification Search
USPC .......................................... 405/128.7, 128.75
See application file for complete search history.

(56) References Cited

U.S. PATENT DOCUMENTS

| | | | | |
|---|---|---|---|---|
| 5,545,803 | A * | 8/1996 | Heath | B09C 1/06 405/128.6 |
| 5,846,393 | A * | 12/1998 | Clarke | B09C 1/005 204/450 |
| 5,865,964 | A * | 2/1999 | Clarke | B09C 1/085 204/232 |
| 5,976,348 | A * | 11/1999 | Pugh | B09C 1/085 204/515 |
| 6,145,244 | A | 11/2000 | Hodko et al. | |
| 6,193,867 | B1 * | 2/2001 | Hitchens | B01D 61/56 204/515 |
| 6,255,551 | B1 * | 7/2001 | Shapiro et al. | B09C 1/002 204/515 |
| 6,413,399 | B1 * | 7/2002 | Kasevich | A01B 47/00 204/515 |
| 6,984,306 | B2 * | 1/2006 | Doering et al. | B09C 1/085 204/515 |
| 9,162,264 | B2 | 10/2015 | Guo et al. | |
| 2014/0360888 | A1 * | 12/2014 | He et al. | B09C 1/085 205/743 |
| 2018/0043405 | A1 | 2/2018 | Guo et al. | |

FOREIGN PATENT DOCUMENTS

| | | |
|---|---|---|
| CN | 102294350 A | 12/2011 |
| CN | 203253713 U | 10/2013 |
| CN | 104550216 A | 4/2015 |
| CN | 104550217 A | 4/2015 |
| CN | 104646403 A | 5/2015 |
| CN | 105290104 A | 2/2016 |
| CN | 105312308 A | 2/2016 |
| JP | 2006346549 A | 12/2006 |

OTHER PUBLICATIONS

Chinese Office Action dated Feb. 26, 2018 for CN Application No. 201610137627.0 (4 pages in Chinese with English Translation).
International Search Report dated Dec. 12, 2016 for International Patent Application No. PCT/CN2016/077779 (4 pages in Chinese with English translation).
Written Opinion dated Dec. 12, 2016 for International Patent Application No. PCT/CN2016/077779 (4 pages in Chinese with English translation).
International Preliminary Report on Patentability dated Sep. 11, 2018 for International Patent Application No. PCT/CN2016/077779 (4 pages in Chinese with English translation).
Li, Ting-ting, et al. Effect of Periodic Switching Electrode Polarity on Electro-Bioremediation of Oil Contaminated Soil. China Academic Journal Electronic Publishing House. Environmental Engineering: Soil Remediation. 2015. pp. 154 and 159-163 (in Chinese with English abstract and machine translation).

* cited by examiner

POTENTIAL DIFFERENCE-BASED DIVERSION ELECTRODE ARRANGEMENT AND FIELD INTENSITY COMPENSATION METHOD

TECHNICAL FIELD

The present invention relates to the technical field of electrokinetic remediation for organic contaminated soil, and particularly to a potential difference-based diversion electrode arrangement and field intensity compensation method.

BACKGROUND

Electrokinetic remediation is an emerging technology for the remediation of organic contaminated soil. In the existing electrokinetic remediation process, electrodes are inserted into contaminated soil to form an electrode matrix, and a weak direct current is applied to form an electric field. Under the combined action of electrochemical reactions and electrokinetic effects, organic pollutants in soil can be effectively removed.

The present study indicates that the degradation of organic pollutants is mainly implemented through electrochemical oxidation, and the degradation rate of pollutants is in positive correlation with the electric field intensity. Such degradation of organic pollutants by the field intensity mainly occurs around electrodes, especially an acid soil region caused by anode reaction. This is because an electrode composed of good conductors is an electronic conductor, and electrode reaction occurs to the soil around same, thereby promoting the execution of electrochemical reactions and efficiently degrading organic pollutants. However, soil is an ion conductor. Therefore, in the soil away from the electrode, the field intensity is relatively weak, and the degradation efficiency of organic pollutants is relatively low.

At the present stage, to reduce the space of the degradation rate of organic pollutants, a manner of forming an electric field with relatively uniform field intensity through electrode arrangement and electrode polarity switching is used (CN 102294350 B). However, because the concentrations of organic pollutants in soil are non-uniformly distributed, it is difficult for the field intensity to match a pollutant concentration field. Aiming at this problem, the frequently-used methods for field intensity compensation include: first, the spatial distribution of field intensity is controlled by changing the electrode potential around a region of field intensity to be compensated from the potential; second, local field intensity is adjusted by changing the electrode density of the region of field intensity to be compensated from the electrode density; and third, the two are combined.

However, because these methods all need to use an external power supply, energy consumption and maintenance costs are increased, and moreover, such important current situation, i.e. the gradient change of the potential of the existing electric field in space is neglected. Therefore, how to use the change in the difference of potential in the electric field to enhance local field intensity in an arrangement manner of paired diversion electrodes, construct the spatial distribution of the field intensity matching the pollutant concentration field, and strengthen the degradation of organic pollutants has important significance for increasing the overall efficiency of electrokinetic remediation for organic contaminated soil.

SUMMARY

The purpose of the present invention aims to provide a potential difference-based diversion electrode arrangement and field intensity compensation method.

To realize the above-mentioned purposes, the present invention discloses the technical solution: a potential difference-based diversion electrode arrangement and field intensity compensation method, comprising the following steps:

The arrangement positions of paired diversion electrodes are determined according to the difference of potential around the position of field intensity to be compensated and the direction of an electric field line, and the paired diversion electrodes are inserted, wherein the paired diversion electrodes are composed of an electrode A and an electrode B which are made of the same material, and a conducting line connecting the two;

the electrode A and the electrode B are arranged in parallel, and the upper ends thereof are connected by the conducting line, and the upper end of the electrode A is opposite to the upper end of the electrode B in polarity.

The step of determining the arrangement positions of paired diversion electrodes according to the difference of potential around the position of field intensity to be compensated and the direction of an electric field line comprises the following steps:

1) The geometric center of a region to be compensated is determined to be a position a of field intensity to be compensated;

2) The electrode A and the electrode B are arranged at both sides of the position c of field intensity to be compensated at equal distance, and the following conditions are met:

2.1) The arrangement positions of the paired diversion electrodes A and B are a and b respectively, and a, b and c are on the same electric field line f;

2.2) A difference of potential exists between the positions a and b;

2.3) Change in the potential between the positions a and b in the direction of the electric field line is monotone increasing or monotone decreasing.

After the paired diversion electrodes are inserted, the field intensity enhancement rate of the position of field intensity to be compensated and the compensated field intensity value are calculated according to the difference of potential and arrangement positions of the paired diversion electrodes.

The field intensity enhancement rate of the position of field intensity to be compensated is:

$$I = \frac{K \times |U_a \times d_{ac}^2 + U_b \times d_{bc}^2|}{d_{ac}^2 \times d_{bc}^2 \times E_c}$$

wherein I is the field intensity enhancement rate of the position a of field intensity to be compensated; $U_a$ and $U_b$ are potential of the positions a and b; $d_{ac}$ and $d_{bc}$ are distances between the position a and the position c, and the position b and the position c respectively; $E_c$ is the original field intensity of the position c; and K is an attenuation coefficient of the potential in a dielectric.

The compensated field intensity value is:

$$E = (1+I) \times E_c$$

wherein E is the compensated field intensity of the position c of field intensity to be compensated; I is the original field intensity enhancement rate of the position a of field intensity to be compensated; and $E_c$ is the original field intensity of the position c.

The present invention has the following beneficial effects and advantages:

In the present invention, paired diversion electrodes are arranged in the direction of the electric field line based on the spatial difference of potential in the electric field, soil as ion conductors is substituted by taking the features of electrodes as electronic conductors, the electrodes are used, the compensation of local field intensity is implemented, and the electrochemical reaction of local organic pollutants is accelerated, thereby beneficial to improving the overall efficiency of electrokinetic remediation for organic contaminated soil, and reducing the spatial difference of remediation efficiency.

DETAILED DESCRIPTION

Figure 1:
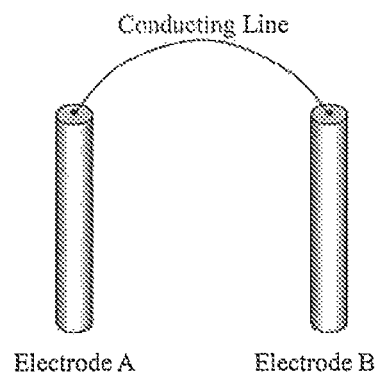
FIG. 1 is a composition diagram showing an apparatus with paired diversion electrodes in the present invention.

The present invention will be further described in detail below in combination with the drawings and the embodiments.

A potential difference-based diversion electrode arrangement and field intensity compensation method, comprising the following steps:

(1) The arrangement positions of paired diversion electrodes are determined according to the difference of potential around the position of field intensity to be compensated and the direction of an electric field line;

(2) The field intensity enhancement rate of the position of field intensity to be compensated and the compensated field intensity value are calculated according to the difference of potential and arrangement positions of the paired diversion electrodes, wherein (1) The paired diversion electrodes are specifically composed of an electrode A and an electrode B which are made of the same material, and a conducting line connecting the two;

(2) The electrode A and the electrode B which are connected by the conducting line are placed in the electric field, to form a closed loop, and the field intensity compensation is implemented through a local electrode reaction.

The arrangement positions of the diversion electrodes should meet the following conditions:

(1) The arrangement positions a and b of the paired diversion electrodes A and B should cover the position c of field intensity to be compensated;

(2) The positions a, b and c should be on the same electric field line f;

(3) A difference of potential exists between the positions a and b, $\Delta U=|Ua-Ub|>0$; Uc and Ub are potential of the positions a and b;

(4) The change in the potential between the positions a and b in the direction of the electric field line is monotone increasing or monotone decreasing, i.e. $(U_x-U_y)\times(x-y)>0$ (x, y∈{any two points between the positions a and b on the electric field line f, and x≠y}).

The field intensity enhancement rate and the compensated field intensity value are specifically calculated by the following technical method:

(1) After diversion electrodes are arranged according to the conditions, the field intensity enhancement rate I of the position c is as shown in formula (1):

$$I = \frac{K \times |U_a \times d_{ac}^2 + U_b \times d_{bc}^2|}{d_{ac}^2 \times d_{bc}^2 \times E_c} \quad \text{formula (1)}$$

wherein I is the field intensity enhancement rate (%) of the position c; $U_a$ and $U_b$ are potential (V) of the positions a and b; $d_{ac}$ and $d_{bc}$ are distances (cm) between the position a and the position c, and the position b and the position c respectively; $E_c$ is the original field intensity (V/cm) of the position a; and K is an attenuation coefficient ($cm^{-1}$) of the potential in a dielectric.

(2) The compensated field intensity value E is calculated by the method as shown in formula (2)

$$E=(1-I)\times Ec \quad \text{formula (2)}$$

wherein E is the compensated field intensity (V/cm) of the position c; I is the original field intensity enhancement rate (%) of the position c; and Ec is the original field intensity (V/cm) of the position c.

Embodiment 1

The contaminated soil remedied in this embodiment is petroleum-contaminated soil configured in the laboratory, the collected soil is loamy soil from which macroscopic impurities and roots of grass and trees are removed, is air-dried naturally indoors and then sieved using a sieve of 2 mm, petroleum is extracted from a certain petroleum pit of Shuguang Oil Production Plant, Liaohe Oil Field Company, and is prepared into petroleum-contaminated soil of 45 g/kg. The prepared soil is air-dried naturally for 7 days, the moisture content is adjusted to be 20% using deionized water, three treatments are conducted, i.e. control remediation, electrokinetic remediation and electrokinetic remediation for field intensity to be compensated, and the soil is respectively loaded into a remediation apparatus (20 cm L×10 cm W×10 cm H).

Figure 2:
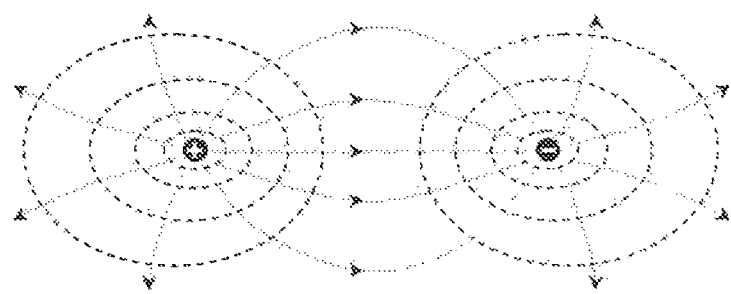
FIG. 2 is a schematic diagram showing a potential isoline in an electric field and a spatial distribution of field intensity in embodiment 1 of the present invention.

As shown in FIG. 1, the contaminated soil remediation apparatus has an arrangement manner of electrodes of 1×2, and the electrodes are made of graphite, each having a diameter Φ of 1 cm, a height of 11 cm, and an external voltage of 20V. The two electrodes are kept to be opposite in polarity, and the formed electric field is as shown in FIG. 2. The electrode polarity switching time is 4 h, and the remediation time is 60 d.

Figure 3:
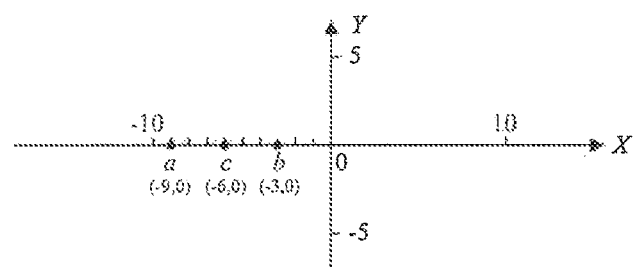
FIG. 3 is a diagram showing a position of field intensity to be compensated and arrangement positions of paired diversion electrodes in embodiment 1 of the present invention.

The specific operation flow includes:

Step 1: An appropriate coordinate system covering the overall electric field is established according to the arrangement positions of electrodes and the spatial distribution of the electric field, and the position of field intensity to be compensated is determined according to the spatial distribution of pollutants;

(1) An X-Y coordinate system which takes a connecting line between the original electrode P1 and electrode P2 as X axis (lateral axis) and a middle line of the connecting line between the electrode P1 and the electrode P2 as Y axis (longitudinal axis) is established (FIG. 3) according to the arrangement positions of the electrodes and the spatial distribution of the electric field (FIG. 2), wherein the positions of the electrode P1 and the electrode P2 are (−10, 0) and (10, 0) respectively;

(2) By taking the sum of the mean value μ of pollutant concentrations and the standard deviation δ as a threshold, the spatial distribution of the pollutant concentrations is divided into a high concentration region and a low concentration region; and because of the heterogeneity of the spatial distribution of pollutants, if field intensity compensation is conducted at the geometric center of the region with higher pollutant content, the position c of field intensity to be compensated is (−6, 0).

Step 2: The arrangement positions of paired diversion electrodes are determined according to the difference of potential around the position of field intensity to be compensated and the direction of an electric field line;

(1) The positions a and b meeting the following conditions are selected:

Condition 1: The positions a, b and c should be on the same electric field line f;

Condition 2: A difference of potential exists between the positions a and b, i.e. $\Delta U = |U_a - U_b| > 0$;

Condition 3: The change in the potential between the positions a and b in the direction of the electric field line is monotone increasing or monotone decreasing, i.e. $(U_x - U_y) \times (x - y) > 0$ ($x, y \in$ {any two points between the positions a and b on the electric field line f, and $x \neq y$}).

(2) The diameter Φ of each of the electrodes is taken into account, to guarantee that the electrodes are not overlapped with each other; the paired diversion electrodes A and B are arranged at both sides of the position c at equal distance, and the arrangement positions a and b in this embodiment are (−9, 0) and (−3, 0) respectively;

(3) The positions a, b and a are all on the electric field line of y=0, a difference of potential exists between a and b, i.e. $\Delta U = |9.47 - 0.66| = 8.81 > 0$, and the change in the potential between the positions a and b in the direction of the electric field line is monotone decreasing.

Step 3: The field intensity enhancement rate and the compensated field intensity value of the position of field intensity to be compensated are calculated according to the difference of potential and arrangement positions of the paired diversion electrodes;

(1) It is measured through experiment that the soil in this embodiment is loamy soil, when the moisture content is 20%, the attenuation coefficient K of field intensity can be calculated by the comparison between the actually measured value and the theoretical value of the potential at the position c, namely, K at the position c is equal to $U_{actually\ measured\ value}/U_{theroretical\ value} = 0.45$;

(2) Values of potential $U_a$, $U_b$ and $U_c$ at the positions a, b and c are measured by a high-precision potential measuring instrument;

(3) According to the positions of a, b and c in the X-Y coordinate system, calculation is conducted to obtain distances $d_{ac}$ and $d_{bc}$ between a and c, and b and c;

(4) The field intensity $E_c$ of the position c is calculated according to the actually measured value $U_c$ and the spatial distribution of field intensity in this embodiment;

(5) Parameter values required by the formula (1) are shown in Table 1 in details:

TABLE 1

Calculation Parameters of Field Intensity Enhancement Rate

| Items | K | $U_a$ | $U_b$ | $d_{ac}$ | $d_{bc}$ | $E_c$ |
|---|---|---|---|---|---|---|
| Unit | cm$^{-1}$ | V | V | cm | cm | V/cm |
| Source | Experiment | Actual measurement | Actual measurement | Calculation | Calculation | Actual measurement |
| Numerical Values | 0.45 | 9.47 | 0.66 | 3 | 3 | 0.59 |

(2) According to formula (1) and formula (2), the field intensity enhancement rate I of the position c of field intensity to be compensated and the compensated field intensity value E are calculated respectively as:

$I = 0.45 \times |9.47 \times 3^2 + 0.66 \times 3^2|/(3^2 \times 3^2 \times 0.59) = 85.8\%$ $E = (1 + 0.858) \times 0.59 = 1.10$ (V/cm)

Step 4: Sampling is conducted and remediation results are compared:

(1) Point arrangement sampling is conducted according to a grid of 5×3, and the concentration of petroleum pollutants in soil, i.e. the residual amount after remediation, is measured using the infrared spectropliotometry.

(2) Experiment treatment results are shown in Table 2 in detail.

TABLE 2

Experiment Treatment Results

| Groups | Treatment | Initial pollutant content (g/kg) | Remediation efficiency (%) | Degree of variation of residual amount space (%) |
|---|---|---|---|---|
| Control group | No | 45 ± 6 | 3.4 | 12.4 |
| Experimental group 1 | Electrokinetic remediation | 43 ± 3 | 53.7 | 8.7 |
| Experimental group 2 | Electrokinetic remediation for field intensity to be compensated | 47 ± 7 | 65.7 | 3.2 |

Embodiment 2

Embodiment 2 is different from embodiment 1 in that:

The remedied contaminated soil is pyrene-contaminated soil, the pyrene content is about 100 mg/kg, and the soil is sandy loam soil. Three treatments are conducted, i.e. control remediation, electrokinetic remediation and electrokinetic remediation for field intensity to be compensated, and the soil is respectively loaded into a remediation apparatus (24 cm L×12 cm W×10 cm H).

The contaminated soil remediation apparatus has an arrangement manner of electrodes of 1×2, and the electrodes are made of iron, each having a diameter Φ of 1 cm, a height of 11 cm and an external voltage of 24V. The two electrodes are kept to be opposite in polarity. The electrode polarity switching time is 2 h, and remediation time is 30 d.

Figure 4:
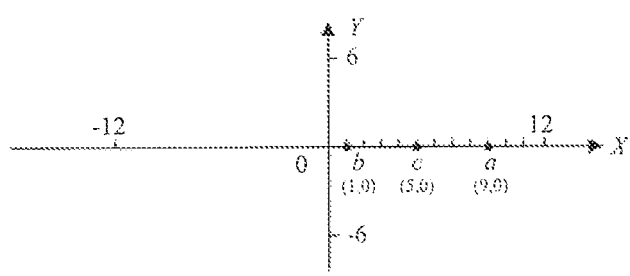
FIG. 4 is a diagram showing a position of field intensity to be compensated and arrangement positions of paired diversion electrodes in embodiment 2 of the present invention.

The specific operation flow includes:

Step 1: The position of field intensity to be compensated is determined;

(1) An X-Y coordinate system is established (FIG. 4) according to the arrangement positions of the electrodes and the spatial distribution of the electric field, wherein the positions of the electrode $P_1$ and the electrode $P_2$ are (−12, 0) and (12, 0) respectively;

(2) if field intensity compensation is conducted at the geometric center of the region with higher pollutant content in this embodiment, the position c of field intensity to be compensated is (5, 0).

Step 2: The arrangement positions of paired diversion electrodes are determined;

(1) The electric field characteristics, the positions a, b and c, and the diameters Φ of the electrodes are comprehensively taken into account, the paired diversion electrodes A and B are arranged at both sides of the position a at equal distance, and the arrangement positions a and b are (9, 0) and (1, 0) respectively;

(2) The positions a, b and c are all on the electric field line of a difference of potential exists between a and b, i.e. ΔU=|9.47−0.66|=8.81>0, and the change in the potential between the positions a and b in the direction of the electric field line is monotone decreasing.

Step 3: The field intensity enhancement rate of the field intensity position to be compensated and the compensated field intensity value are calculated;

(1) Parameter values K, $U_a$, $U_b$, $d_{ac}$ $d_{bc}$ and $E_c$ are obtained by experiment, actual measurement and calculation, see Table 3 for details.

TABLE 3

Calculation Parameters of Field Intensity Enhancement Rate

| Items | K | $U_a$ | $U_b$ | $d_{ac}$ | $d_{bc}$ | $E_c$ |
|---|---|---|---|---|---|---|
| Unit | $cm^{-1}$ | V | V | cm | cm | V/cm |
| Source | Experiment | Actual measurement | Actual measurement | Calculation | Calculation | Actual measurement |
| Numerical values | 0.53 | 3.43 | 0.17 | 4 | 4 | 0.20 |

(2) According to formula (I) and formula (2), the field intensity enhancement rate I of the position c of field intensity to be compensated and the compensated field intensity value E are calculated respectively as:

$$I=0.53\times|3.43\times4^2+0.17\times4^2|/(4^2\times4^2\times0.02)=59.6\%$$

$$E=(1+0.596)\times0.20=0.32 \text{ (V/cm)}$$

Step 4: Sampling is conducted and remediation results are compared:

(1) Point arrangement sampling is conducted according to a grid of 5×3 the concentration of pyrene in soil, i.e. the residual amount after remediation, is measured using the EPA method.

(2) Experiment treatment results are shown in Table 4 in detail.

TABLE 4

Experiment Treatment Results

| Groups | Treatment | Initial pollutant content (mg/kg) | Remediation efficiency (%) | Degree of variation of residual amount space (%) |
|---|---|---|---|---|
| Control group | no | 100 ± 7 | 2.4 | 7.8 |
| Experimental group 1 | Electrokinetic remediation | 100 ± 10 | 49.8 | 7.1 |
| Experimental group 2 | Electrokinetic remediation for field intensity to be compensated | 100 ± 8 | 57.4 | 2.9 |

The above contents are further detailed descriptions of the present invention in combination with specific preferential embodiments. However, it cannot be considered that the specific embodiments of the present invention are only limited to these descriptions. Several simple deductions or replacements may be made without departing from the conception of the present invention, all of which shall be considered to belong to the protection scope of the present invention.

We claim:

1. A potential difference-based diversion electrode arrangement and field intensity compensation method, comprising the following steps:

determining arrangement positioning of a paired set of diversion electrodes, which arrangement positioning is determined according to a difference of potential around a position of field intensity to be compensated and the direction of an electric field line formed by an additional pair of matrix electrodes, and the paired set of diversion electrodes are spaced along the electric field line in accordance with the determined arrangement positioning, and wherein the paired set of diversion electrodes are composed of opposite polarity electrode A and electrode B, and a conducting line connecting the electrode A and electrode B, and wherein determining the arrangement positioning of the paired set of diversion electrodes according to the difference of potential around the position of field intensity to be compensated and the direction of an electric field line comprises the following steps:

the electrode A and the electrode B are installed at both sides, at equal distances, of the geometric center of a region to be compensated that is determined to be a position c of field intensity to be compensated, the position c of field intensity to be compensated satisfying the following conditions:

(i) the positions of installation of the paired set of diversion electrodes A and B are a and b respectively, and a, b and c are on the same electric field line f, (ii) a difference of potential exists between the positions a and b;

(iii) change in the potential between the positions a and b in the direction of the electric field line is monotone increasing or monotone decreasing.

2. The potential difference-based diversion electrode arrangement and field intensity compensation method of claim 1, wherein the paired set of diversion electrodes are made of the same material.

3. The potential difference-based diversion electrode arrangement and field intensity compensation method of claim 1, wherein the electrode A and the electrode B are arranged in parallel, and the upper ends are connected by the conducting line; and the upper end of the electrode A is opposite to the upper end of the electrode B in polarity.

4. The potential difference-based diversion electrode arrangement and field intensity compensation method of claim 1, wherein after the paired set of diversion electrodes are installed there is an enhancement in, the field intensity enhancement rate of the position of field intensity to be compensated.

5. The potential difference-based diversion electrode arrangement and field intensity compensation method of claim 4, wherein the enhancement in the field intensity rate of the position of field intensity to be compensated, which is provided by the installment of the paired set of diversion electrodes, is:

$$I = \frac{K \times |U_a \times d_{ac}^2 + U_b \times d_{bc}^2|}{d_{ac}^2 \times d_{bc}^2 \times E_c}$$

wherein I is the field intensity enhancement rate of the position c of field intensity to be compensated; $U_a$ and $U_b$ are potential of the positions a and b; $d_{ac}$ and $d_{bc}$ are distances between the position a and the position c, and the position b and the position c respectively; $E_c$ is the original field intensity of the position c; and K is an attenuation coefficient of the potential in a dielectric.

6. The potential difference-based diversion electrode arrangement and field intensity compensation method of claim 4, wherein installation of the paired set of diversion electrodes results in the compensated field intensity value being:

$$E = (1+I) \times E_c$$

wherein E is the compensated field intensity of the position c of field intensity to be compensated; I is the original field intensity enhancement rate of the position c of field intensity to be compensated; and $E_c$ is the original field intensity of the position c.

* * * * *